United States Patent [19]

De Beukelaar et al.

[11] 4,065,610

[45] Dec. 27, 1977

[54] TREATMENT OF CONTAMINATED HYDROCARBON FROM OLEFIN POLYMERIZATION

[75] Inventors: Jan W. De Beukelaar, Amsterdam; Henry Van Zwet, The Hague; Jacob B. Roest, Amsterdam, all of Netherlands

[73] Assignee: Shell Oil Company, Houston, Tex.

[21] Appl. No.: 731,593

[22] Filed: Oct. 12, 1976

[30] Foreign Application Priority Data

Oct. 14, 1975 United Kingdom ............... 41990/75

[51] Int. Cl.$^2$ .......................... C08F 6/00; C08F 10/00; C08F 10/06

[52] U.S. Cl. ....................................... 526/70; 526/67; 526/351; 526/912; 528/494

[58] Field of Search ................. 526/70, 67, DIG. 912; 528/494

[56] References Cited

U.S. PATENT DOCUMENTS

| | | | |
|---|---|---|---|
| 3,271,380 | 9/1966 | Dietz | 528/494 |
| 3,281,399 | 10/1966 | Renaudo et al. | 528/494 |
| 3,300,464 | 1/1967 | Dietz | 526/351 |
| 3,436,386 | 4/1969 | Harris | 528/494 |

FOREIGN PATENT DOCUMENTS

| | | | |
|---|---|---|---|
| 1,026,963 | 3/1958 | Germany. | |
| 102,885 | 12/1973 | Japan. | |
| 26,785 | 12/1963 | Japan | 528/494 |
| 1,045,199 | 10/1966 | United Kingdom. | |

*Primary Examiner*—Alan Holler

[57] ABSTRACT

In conventional olefin polymerization using TiCl$_3$-containing Ziegler type catalysts, the catalyst-containing reaction product may be de-ashed by treatment with titanium-solubilizing compounds such as alcohols and the polymer product from the de-ashing step washed with a hydrocarbon to separate it from catalyst residue. It is desirable to treat the dirty hydrocarbon wash liquid to recover purified hydrocarbon suitable for recycle to the polymerization reaction. According to this invention the dirty hydrocarbon wash liquid is treated with an epoxy compound in the presence of an alcohol and distilled to recover purified hydrocarbon suitable for recycle.

7 Claims, No Drawings

TREATMENT OF CONTAMINATED HYDROCARBON FROM OLEFIN POLYMERIZATION

BACKGROUND OF THE INVENTION

1. Field of the Invention

The invention relates to a method for a purifying a hydrocarbon wash liquid from the de-ashing of an olefin polymer prepared using $TiCl_3$ and an organoaluminum compound as catalyst.

2. Description of the Prior Art

The polymerization of 1-olefins by contact with so-called Ziegler or Ziegler-Natta catalysts comprising essentially titanium trichloride and an aluminum alkyl compound is a well developed art. The olefin of prime commercial interest in this type of process is propylene. Although the present invention is applicable in the work-up of any of the known Ziegler polymers of 1-olefins, including, for example, polyethylene, poly(4-methyl-1-pentane) and ethylene-propylene copolymers, it will be discussed primarily in terms of polypropylene work-up. Commercial processes for production of polypropylene predominantly employ a liquid hydrocarbon medium of higher boiling point than propylene as diluent in the polymerization reaction. It is also known to conduct the polymerization in a medium consisting of propylene which may contain minor amounts of propane and possible small amounts of other hydrocarbon components.

The crude propylene polymers obtained in this way contain catalyst residues which may adversely affect the properties of the polymer. By "catalyst residues" is meant the catalyst and any decomposition products or derivatives thereof which may be formed during the polymerization.

In addition to catalyst residues, the polymerization reaction product also contains some hydrocarbon-soluble propylene polymer components, usually referred to as atactic polypropylenes, which it may be desirable to remove in whole or in part prior to recovery of the desired propylene polymer product.

Many different methods have been disclosed in the art for treating propylene polymerization reaction product for deactivation of catalyst components, removal of deactivated catalyst components and removal of undesired atactic polymer. A number of different methods are employed in commercial propylene polymerization processes.

The procedure whereby catalyst residues are removed from the polymer is usually termed "de-ashing". In general the de-ashing comprises two steps. First the catalyst residues are solubilized by treatment, for example, with oxygen and/or certain organic compounds such as alcohols or dicarbonyl compounds. The second step involves washing the polymer with a suitable wash liquid, for example, a hydrocarbon, to remove the solubilized residues. An example of a suitable de-ashing procedure is to be found in Netherlands patent application No. 7,600,033, published July 9, 1976.

Most of the usual solubilization steps result in the liberation of hydrogen chloride, which may give rise to corrosion problems in process vessels and conduits, or require the use of expensive corrosion-resistant equipment. It has been proposed to prevent corrosion difficulties due to HCl liberation by adding during the solubilization step an alkylene oxide, such as propylene oxide, which reacts with the HCl evolved for form a chlorohydrin. Part of this chlorohydrin tends to remain adsorbed on the treated polymer particles, even after washing the latter with a liquid hydrocarbon. The presence of alkylene oxide and/or chlorohydrin in the polymer product is undesirable, especially if articles are manufactured from such polymer which will come into contact with food.

Another disadvantage of the use of relatively volatile alkylene oxides, such as propylene oxide, is that in the fractionation step which is part of the work-up of the dirty hydrocarbon wash liquid separated from the polymer product, the alkylene oxide may contaminate the clean diluent or the monomer which are recovered for recirculation to the polymerization reactor. This would interfere with the catalytic polymerization activity of the $TiCl_3$ and organoaluminum compound. Moreover, because of the volatility of the propylene oxide, it will be substantially absent in the heavier component stream of the fractionator containing the amorphous polymer and catalyst residues, as a result of which corrosion may occur in the subsequent work-up apparatus.

SUMMARY OF THE INVENTION

The present invention is concerned with an improved procedure whereby the content of free HCl, and hence the corrosivity, of the wash liquid from washing of olefin polymer after a de-ashing step involving contact with a titanium solubilizing composition, can be reduced.

The invention consists of a method for reducing the HCl-content of a hydrocarbon wash liquid from the de-ashing of an olefin polymer prepared using $TiCl_3$ and an organoaluminum compound as catalyst, characterized in that, after separation from the polymer, the wash liquid is treated with an epoxy compound in the presence of an alcohol.

DESCRIPTION OF THE PREFERRED EMBODIMENTS

The invention is an improvement in the conventional process for the polymerization of a 1-olefin, in particular propylene, in the presence of $TiCl_3$ and an organoaluminum compound, in which the resulting reaction mixture or the separated polyolefin powder is treated to decompose the catalyst residues, washed with a liquid hydrocarbon and separated from the wash liquid, and in which the dirty wash liquid is treated to purify it for recycle to the polymerization stage. According to this invention the purification of the separated wash liquid is carried out after addition of a higher boiling epoxy compound and in the presence of an alcoholic compound.

It has been found that the anti-corrosive action of the epoxy compound is substantially enhanced by the presence of the alcoholic compound. By adding the epoxy compound to the separated wash liquid, the polymer product is not contaminated by the epoxy compound and its chlorohydrin. Due to the higher boiling point of the epoxy compound and its chlorohydrin, the purified wash liquid, which has a lower boiling point, will be free of these substances and may be recirculated as such.

The epoxy compound is preferably a glycidyl derivative, in particular a monoglycidyl ester or ether. Preferred are compounds having the formula:

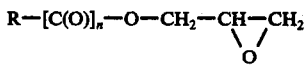

in which R is an alkyl group having up to 20 carbon atoms, preferably 3 to 16 carbon atoms, or an aryl group and $n$ is 0 or 1. Examples of suitable monoglydicyl compounds are butyl glycidyl ether, octyl glycidyl ether, dodecyl glycidyl ether, phenyl glycidyl ether, cresyl glycidyl ether, glycidyl benzoate, glycidyl decanoate, glycidyl stearate and mixtures of such compounds.

The glycidyl derivative may also contain two or more glycidyl groups per molecule, for example diglycidyl aniline, the diglycidyl ether of propylene glycol, the di- and triglycidyl ether of trimethylolpropane, the diglycidyl ester of linoleic dimer acid and the diglycidyl ester of hexahydrophthalic acid.

The amount of epoxy compound added to the wash liquid is preferably sufficient to react with all the HCl present in the wash. In practice it is found that the amount of epoxy compound may be expressed in terms of the titanium content of the wash liquid. The amount of epoxy compound should preferably be such as to contain from 3 to 20, and more preferably from 5 to 15 epoxy groups per atom of titanium.

The epoxy compound should have a sufficiently higher boiling point than the highest boiling hydrocarbon constituent of the wash liquid which is to be recovered in purified form. Suitably the epoxy compound has an atmospheric boiling point at least about 20° C higher than such hydrocarbon. For example, when the highest boiling wash liquid constituent which is to be recovered is isooctane (2,2,4-trimethyl pentane), which boils at about 99.3° C, the epoxy compound should have a boiling point of at least about 120° C. Epoxy compounds boiling above about 200° C are preferred.

It is desirable that the epoxy compound possesses sufficient solubility in the separated wash liquid, i.e. the required amount of epoxy compound should be substantially soluble in said liquid at the temperature of the separation of the liquid.

Preferred alcohols for use in the method of the invention are alkanols having one hydroxyl group only and up to 20 carbon atoms, in particular 2 to 5 carbon atoms. Normal and secondary butyl alcohol are especially preferred.

if the separated wash liquid already contains an amount of an alcohol from the de-ashing, there may be no need for further alcohol addition; if not, the desired amount is added to the wash liquid separated from the polymer. In general, the total amount of alcohol in the separated wash liquid will be from 0.01 to 10%w, preferably from 0.1 to 2%w (based on the wash liquid).

It has surprisingly been found that the HCl-scavenging properties of the epoxy compound are considerably increased by the presence of the alcohol.

The method of the invention is of particular interest for the treatment of wash liquids from the de-ashing of propylene polymers. Such polymers may be conveniently obtained by polymerization in a liquid medium in the presence of gamma-TiCl$_3$ and an aluminum alkyl such as Al(C$_2$H$_5$)$_2$Cl as catalyst.

Many methods for carrying out this polymerization have been described, including, e.g., gas-phase polymerization in a fluid bed and slurry-type polymerizations in a liquid diluent such as hexane or butane. According to a preferred method the polymerization of propylene is effected in liquid propylene as sole diluent or combined with more or less liquid propane.

The de-ashing procedure may, for example, be carried by a. contacting a slurry of the polymer in a liquid hydrocarbon medium with from 0.01 to 20%w (based on the liquid phase) of an alcohol and optionally with at least 0.1 mol of oxygen, or an equivalent amount of a peroxide, per gram atom of titanium present in the slurry, and b. washing the polymer with a liquid hydrocarbon medium containing from 0 to 20%w (based on the wash liquid) of an alcohol.

This method is described in greater detail in published Netherlands patent application 7,600,033.

The liquid hydrocarbon medium used in (a) and (b) is preferably of the same or similar composition as the reaction diluent, e.g., an excess of the liquid olefin monomer, for example liquid propylene, optionally together with the corresponding saturated hydrocarbon, for example propane. The wash liquid from (b) may then be treated by the method of the invention.

In accordance with well known procedures, it may be useful to add a heavier boiling liquid as "flux" to provide a bottoms fraction in which the used epoxy compound, catalyst residue and other high boiling ingredients may remain dissolved or dispersed during the distillation in which the purified hydrocarbon fractions are recovered.

The invention will now be described in connection with one possible method of purification. Other ways of carrying out the purification are also possible, however, In the substantial absence of other liquid diluents, liquid propylene is continuously polymerized in the presence of hydrogen, gamma-TiCl$_3$ and aluminum diethyl chloride. A general description of such a process has been given, e.g., in British Specification No. 1,372,440. A slurry of polypropylene in liquid propylene is continuously withdrawn from the reactor. Catalyst residues are decomposed by treatment with of n-butyl alcohol (e.g., 1% w based on propylene) and a dilute mixture of oxygen in nitrogen containing, for example, 1 mol of O$_2$/gram atom of titanium present. The decomposed slurry is counter-currently extracted with an equal volume of fresh liquid propylene containing, for example, 1%w of n-butyl alcohol. The polymer product is removed from the bottom of the extraction column for further work-up. The wash propylene, suitably containing about 2%w butanol is separated from the polymer product; glycidyl decanoate is added to it, e.g., in an amount of 7 mol/mol of titanium compound present. This liquid is continuously introduced into a fractionating column from which propylene, oxygen nitrogen and hydrogen are obtained as tops; the propylene, after removal of hydrogen and other gases in a degassing column, may be recycled to the reactor. The fractionator bottoms may be further concentrated to recover a further amount of propylene which contains butanol, and a liquid residue containing amorphous, soluble polymer, chlorohydrins and titanium and aluminum compounds.

The invention is illustrated further in the following Examples.

EXAMPLES 1-7

In order to test the effectiveness of a number of epoxy compounds as HCl-scavenger, tests were performed in a 1250 ml, double-walled, thermostated, stirred reactor provided with a dip-pipe. The reactor was filled with 950 ml of toluene, kerosine or aviation alkylate (a mixture of trimethylpentanes), in some cases containing an alcohol. To the solvent the epoxy compound was added whereupon 1 Nl of $N_2$ per hour was bubbled through the solvent. The effluent gas was led through a vessel measuring the chloride carried with it. In 5 minutes 5.8 mmol of gaseous HCl was introduced into the solvent, after which the reactor was stirred for another 5 minutes. The reactor contents were than brought to a temperature of 40° C and the nitrogen flow increased to 20 Nl/h for 60 minutes. From the amount of HCl introduced into the reactor and the amount in the effluent gas, the effectiveness of the epoxy compound may be calculated as:

$$\frac{\text{(HCl introduced minus HCl in effluent)}}{\text{(HCl introduced)}} \times 100.$$

Results appear from the following table:

| Ex. | Solvent | HCl-scavenger, mmol | Reactor temp., °C | Effectiveness, % |
|---|---|---|---|---|
| 1 | AA + 0.5 %w NBA | 29.6 PGE | 39 | 100 |
| a | AA | 30.2 PGE | 40 | 47.6 |
| 2 | Ker. + 1.25 %w Dol | 33.6 PGE | 40 | 94.3 |
| b | Ker. | 30.7 PGE | 42 | 82.8 |
| 3 | AA + 0.5 %w NBA | 22.6 Ep8 | 41 | 98.8 |
| c | AA | 23.8 Ep8 | 40 | 48.3 |
| 4 | AA + 0.5 %w NBA | 36.0 $C_{10}$ | 43 | 97.2 |
| 5 | AA + 1 %w NBA | 28.4 $C_{10}$ | 43 | 100 |
| 6 | Ker. + 2.5 %w Dol | 31.3 $C_{10}$ | 43 | 100 |
| 7 | AA + 0.5 %w NBA | 32.5 BGE | 38 | 100 |

AA = aviation alkylate
Ker. = Kerosine
Tol. = Toluene
NBA = 1-butanol
Dol = 1-dodecanol
PGE = phenyl glycidyl ether
Ep8 = a $C_{10}$-$C_{16}$-alkyl glycidyl ether
$C_{10}$ = glycidyl decanoate
BGE = butyl glycidyl ether
a-c = comparative experiments.

EXAMPLE 8

A slurry containing 40%w polypropylene was obtained by mass polymerization of liquid propylene at 60° C using gamma-$TiCl_3$ and $Al(C_2H_5)_2Cl$ as catalyst. The slurry was treated with 0.5%w (based on propylene) of n-butanol and a 5%v mixture of oxygen in nitrogen (1 mol $O_2$ per gram atom Ti present), and then washed at 40° C by counter-current flow with fresh liquid propylene containing 2.1%w n-butanol. The volume ratio of fresh propylene to propylene in the slurry was 1.6:1. The dirty wash propylene at this stage contained 1%w n-butanol, 0.0087%w Ti and 0.0046%w Al as well as HCl from the de-ashing. Glycidyl decanoate (3 mol per gram atom Ti present) was then added to the dirty wash propylene which was then distilled in a stainless steel distillation column. The distilled propylene contained less than 0.2 parts per million of HCl based on the weight of propylene. After 400 run hours the distillation column showed no signs of corrosion. When no glycidyl decanoate was added to the propylene wash liquid the distilled propylene container 20 ppmw of HCl.

We claim as our invention:

1. In a process for the polymerization of 1-olefins by contact with a catalyst comprising $TiCl_3$ and an organo aluminum compound, wherein the crude olefin polymer is de-ashed by contact with a titaniumsolubilizing composition and the polymer or polymer-containing slurry, recovered from the de-ashing step, is washed with a predominantly hydrocarbon liquid to produce clean polymer which is separated from the dirth wash liquid which contains solubilized catalyst residue, and wherein the resulting dirty wash liquid is separately recovered, the improvement which comprises recovering purified hydrocarbon wash liquid components suitable for recycle to the polymerization reaction, by treating the dirty wash liquid in the presence of dissolved monohydric alcohol with a dissolved glydicyl compound which has a boiling temperature higher than that of said wash liquid and recovering by distillation at least one purified hydrocarbon component from the treated wash liquid.

2. In a process for the polymerization of propylene by contact with a catalyst comprising $TiCl_3$ and an organoaluminum compound in a liquid hydrocarbon diluent consisting predominantly of propylene, wherein the crude polypropylene is de-ashed by contact with a titanium-solubilizing composition and the polypropylene recovered from the de-ashing step is washed with a predominantly hydrocarbon liquid containing liquid propylene to produce clean polypropylene which is separated from the dirty wash liquid which contains solubilized catalyst residue, and wherein the resulting dirty wash liquid is separately recovered, the improvement which comprises recovering purified hydrocarbon wash liquid components, including propylene, suitable for recycle to the polymerization reaction, by adding to the wash liquid a sufficient amount of a glycidyl compound having an atmospheric boiling point at least about 20° C higher than that of the highest boiling hydrocarbon to be recovered in purified form, to provide from 3 to 20 epoxy groups per titanium atom present, and sufficient monohydric alkanol of 2 to 5 carbon atoms per molecule to provide a total alkanol content of 0.01 to 10% by weight, based on total amount of wash liquid, distilling the resulting liquid and recovering at least one purified hydrocarbon component as a distilled fraction, free of catalyst residue, epoxy compound and alcohol.

3. A method according to claim 1 wherein said glycidyl compound is a monoglycidyl ester or ether of the formula

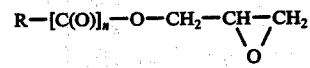

in which R is an alkyl group having up to 20 carbon atoms and n is 0 or 1.

4. A method according to claim 1 wherein said monohydric alcohol is an alkanol of 2 to 5 carbon atoms per molecule and is present in a concentration of from 0.01 to 10%w based on the wash liquid.

5. A method according to claim 1 wherein said hydrocarbon wash liquid is predominantly propylene.

6. A method according to claim 2 wherein the glycidyl compound is glycidyl decanoate.

7. A method according to claim 2 wherein the alcohol is normal or secondary butyl alcohol.